United States Patent
Colonna et al.

(10) Patent No.: US 10,285,006 B2
(45) Date of Patent: *May 7, 2019

(54) METHOD AND SYSTEM FOR ESTIMATING A NUMBER OF PERSONS IN A CROWD

(71) Applicant: TELECOM ITALIA S.p.A., Milan (IT)

(72) Inventors: Massimo Colonna, Turin (IT); Marco Mamei, Reggio Emilia (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 15/538,669

(22) PCT Filed: Dec. 30, 2014

(86) PCT No.: PCT/EP2014/079431
§ 371 (c)(1),
(2) Date: Jun. 22, 2017

(87) PCT Pub. No.: WO2016/107644
PCT Pub. Date: Jul. 7, 2016

(65) Prior Publication Data
US 2017/0339521 A1  Nov. 23, 2017

(51) Int. Cl.
*H04W 4/02* (2018.01)
*H04W 4/021* (2018.01)
*H04W 4/029* (2018.01)

(52) U.S. Cl.
CPC ........... *H04W 4/022* (2013.01); *H04W 4/029* (2018.02)

(58) Field of Classification Search
CPC ....... H04W 4/022; H04W 4/029; G06F 17/18; G08G 1/01
See application file for complete search history.

(56) References Cited

U.S. PATENT DOCUMENTS

| | | |
|---|---|---|
| 2011/0295577 A1 | 12/2011 | Ramachandran |
| 2013/0225196 A1 | 8/2013 | James et al. |
| 2013/0226543 A1 | 8/2013 | Ramachandran |

OTHER PUBLICATIONS

Laura Ferrari, et al., "Discovering events in the city via mobile network analysis," Journal of Ambient Intelligence and Humanized Computing, XP035318373, vol. 5, 2012, pp. 265-277.
V. A. Traag, et al., "Social Event Detection in Massive Mobile Phone Data Using Probabilistic Location Inference," 2011 IEEE International Conference on Privacy, Security, Risk, and Trust, and IEEE International Conference on Social Computing, XP032090268, Oct. 9, 2011, pp. 625-628.
International Search Report dated Sep. 2, 2015 in PCT/EP2014/079431 filed Dec. 30, 2014.

*Primary Examiner* — Kamran Afshar
*Assistant Examiner* — Minjung Kim
(74) *Attorney, Agent, or Firm* — Oblon, McClelland, Maier & Neustadt, L.L.P.

(57) ABSTRACT

A method of estimating a number of persons that gathered at an Area of Interest for attending a public happening during a time interval on a day is proposed. Said Area of Interest is defined by an Area of Interest center and an Area of Interest radius and is covered by a mobile telecommunication network having a plurality of communication stations each of which is adapted to manage communications of user equipment in one or more served areas in which the mobile telecommunication network is subdivided.

20 Claims, 7 Drawing Sheets

METHOD AND SYSTEM FOR ESTIMATING A NUMBER OF PERSONS IN A CROWD

BACKGROUND OF THE INVENTION

Field of the Invention

The present invention relates to crowd counting, i.e. to techniques for counting or estimating the number of persons in a crowd. In the present description and for the purposes of the present invention, by "crowd" it is meant a gathering of a certain number of people, gathered in a certain location for, e.g., attending at public events or happenings, of the most disparate nature, like for example (and non-exhaustively) live television shows, artistic/entertaining performances, cultural exhibitions, theatrical plays, sports contests, concerts, movies, demonstrations and so forth.

Particularly, the present invention relates to crowd counting techniques exploiting information provided by wireless or mobile telecommunication networks.

Overview of the Related Art

In the tasks of urban planning, management of activities (e.g., transport systems management and emergencies management), and tourism and local marketing, it is useful to have a knowledge of amounts of people who gathered at certain locations or Areas of Interest (AoI for short, e.g., a building, such as for example a stadium or a theatre or a cinema, the surroundings thereof, a square or a street(s) of a city or town or village, a district etc.), e.g. because they attended at public happenings like shows (e.g., related to culture, entertaining, politics or sports) that took place within the Area of Interest. In facts, this knowledge allows for example a more effective planning of subsequent public happenings of the same type. Particularly, this knowledge allows a more effective planning and managing of resources and activities (such as infrastructures, transport system and security) directly or indirectly related to similar public happenings that may take place in the future (such as for example sports matches that regularly take place at a stadium). Moreover, from a commercial viewpoint, this knowledge allows a better management of marketing activities intended to promote similar events that may take place in the future.

Nowadays, mobile communication devices (referred to as mobile phones or UE in the following, including cellular phones, smartphones, tablets and the like) have reached a thorough diffusion among the population of many countries, and mobile phone owners almost always carry their mobile phones with them. Since mobile phones communicate with a plurality of base stations of the mobile phone networks, and each base station covers (i.e., serves) one or more predetermined serving areas, or cells, which are known to the mobile communication services provider (e.g. mobile phone network owner or virtual mobile phone services provider), mobile phones result to be optimal candidates as tracking devices for collecting data useful for identifying the amount of people who attended to one or more public happenings.

In the art, many systems and methods have been proposed in order to collect information about time and locations at, and in which, a User Equipment (UE, e.g. a mobile phone, a smartphone, a tablet, etc.) of an individual connects to the mobile phone network (e.g., for performing a voice call or sending a text message), and use such collected information in order to derive information related to how many attendees a certain public happening had.

For example, Francesco Calabrese, Carlo Ratti, "Real Time Rome", Networks and Communications Studies 20(3-4), pages 247-258, 2006, discloses the Real Time Rome project, presented at the 10th International Architecture Exhibition in Venice, Italy. The Real Time Rome project is the first example of a urban-wide real-time monitoring system that collects and processes data provided by telecommunications networks and transportation systems in order to understand patterns of daily life in Rome. Observing the real-time daily life in a town becomes a means to understanding the present and anticipating the future urban environment.

F. Manfredini, P. Pucci, P. Secchi, P. Tagliolato, S. Vantini, V. Vitelli, "Treelet decomposition of mobile phone data for deriving city usage and mobility pattern in the Milan urban region", MOX-Report No. 25/2012, MOX, Department of Mathematics "F. Brioschi", Politecnico di Milano, available at http://mox.polimi.it, discloses a geo-statistical unsupervised learning technique aimed at identifying useful information on hidden patterns of mobile phone use. These hidden patterns regard different usages of the city in time and in space which are related to individual mobility, outlining the potential of this technology for the urban planning community. The methodology allows obtaining a reference basis that reports the specific effect of some activities on the Erlang data recorded and a set of maps showing the contribution of each activity to the local Erlang signal. Results being significant for explaining specific mobility and city usages patterns (commuting, nightly activities, distribution of residences, non systematic mobility) have been selected and their significance and their interpretation from a urban analysis and planning perspective at the Milan urban region scale has been tested.

Ramon Caceres, James Rowland, Christopher Small, and Simon Urbanek, "Exploring the Use of Urban Greenspace through Cellular Network Activity", 2nd Workshop on Pervasive Urban Applications (PURBA), June 2012, discloses the use of anonymous records of cellular network activity to study the spatiotemporal patterns of human density in an urban area. This paper presents the vision and some early results of this effort. Firstly, a dataset of six months of activity in the New York metropolitan area is described. Secondly, a technique for estimating network coverage areas is presented. Thirdly, the used approach in analyzing changes in activity volumes within those areas is described. Finally, preliminary results regarding changes in human density around Central Park are presented.

F. Girardin, A. Gerber, A. Vaccari, A. Biderman, C. Ratti, "Towards estimating the presence of visitors from the aggregate mobile phone network activity they generate", International Conference on Computers in Urban Planning and Urban Management, 2009, examines the use of locally and non-locally registered mobile phones in the vicinity of the "Waterfalls" public exhibit in New York City in 2008. Aggregated statistics (i.e. number of calls) related to the network sectors covering the exhibit and its proximity are studied. With the future contribution of traditional survey techniques, such as field counts, to calibrate these mobile phone network measurements, there is an aim at developing techniques to estimate the aggregate movements and location of visitors through time and space, while assuring their privacy.

F. Calabrese, F. C. Pereira, G. Di Lorenzo, L. Liu, C. Ratti, "The Geography of Taste: Analyzing Cell-Phone Mobility in Social Events," Pervasive Computing, LNCS 6030, Springer, 2010, pp. 22-37, discloses the analysis of crowd mobility during special events. Nearly 1 million cell-phone traces have been analyzed and associated with their destinations with social events. It has been observed that the origins of people attending an event are strongly correlated to the type of event, with implications in city management, since the knowledge of additive flows can be a critical information on which to take decisions about events management and congestion mitigation.

Traag, V. A.; Browet, A.; Calabrese, F.; Morlot, F., "Social Event Detection in Massive Mobile Phone Data Using Probabilistic Location Inference", 2011 IEEE Third International Conference on Privacy, Security, Risk and Trust (Passat), and 2011 IEEE Third International Conference on Social Computing (Socialcom), pp. 625,628, 9-11 Oct. 2011, focuses on unusually large gatherings of people, i.e. unusual social events. The methodology of detecting such social events in massive mobile phone data is introduced, based on a Bayesian location inference framework. More specifically, a framework for deciding who is attending an event is also developed. The method on a few examples is demonstrated. Finally, some possible future approaches for event detection, and some possible analyses of the detected social events are discussed.

SUMMARY OF THE INVENTION

The Applicant has observed that, generally, method and systems known in the art provide unsatisfactory results, as they are not able to determine (or have a limited ability in determining) whether a UE owner has been in an Area of Interest (AoI) where one or more public happenings have been held, for attending thereat or for other reasons (for example, because the UE owner resides or has a business in proximity of, or within, the area of interest). In addition, the results provided by the known solutions are strongly influenced by the size of the area of interest selected for the analysis of the amount of attendees at the one or more public happenings. In other words, if the area of interest has a large size, a certain number of UE owners that are not actually part of the crowd will be taken into account in the evaluation of the number of attendees of the public happening. Conversely, if the area of interest has small size, a certain number of UE owners actually part of the crowd will be excluded from the evaluation of the number of persons in the crowd.

Therefore, subsequent planning and managing of resources and activities (of the type mentioned above) based on results obtained by the methods and systems known in the art will achieve a limited efficiency due to the limited accuracy thereof.

The Applicant has thus coped with the problem of devising a system and method adapted to overcome the problems affecting the prior art solutions.

The Applicant has found that it is possible to determine the size of an optimal area of interest on the basis of operational information related to UE during the course of the one or more public happenings and in a certain number of days preceding the one or more public happenings.

Particularly, one aspect of the present invention proposes a method of estimating a number of persons that gathered at an Area of Interest for attending a public happening Sn during a time interval [Tsn; Ten] on a day gn. Said Area of Interest is defined by an Area of Interest center C and an Area of Interest radius Ra and is covered by a mobile telecommunication network having a plurality of communication stations each of which is adapted to manage communications of user equipment in one or more served areas in which the mobile telecommunication network is subdivided. The method comprises the following steps: a) defining a plurality of calculated radius values Rk of the Area of Interest radius Ra, and, for each calculated radius value Rk: b) identifying a first number of user equipment Unk associated with at least one event record $er_i$ of a corresponding event $e_i$ of interaction occurred between the user equipment and the mobile communication network during the time interval [Tsn; Ten] on the day gn within the Area of Interest; c) identifying a second number Upnk of user equipment associated with at least one event record $er_{i'}$ of a corresponding event $e_{i'}$ of interaction occurred between the user equipment and the mobile communication network during the time interval [Tsn; Ten] for each day gpn of a predetermined number P of previous days gpn preceding the day gn within the Area of Interest; d) combining the first number Unk of user equipment and the second numbers Upnk of user equipment for obtaining a statistical quantity Znk; e) detecting the occurrence of the public happening Sn if the statistical quantity Znk reaches a certain threshold Zth; f) computing an optimum radius value Ro of the Area of Interest radius Ra as the average of the calculated radius values Rk within which the public happening Sn is detected; g) counting a number An of persons that gathered for attending at the public happening Sn within an Area of Interest having the Area of Interest radius Ra equal to the optimum radius values Ro.

Preferred features of the present invention are set forth in the dependent claims.

In one embodiment of the present invention, the public happening Sn comprises a plurality of public happenings, the method further comprising the step of: iterating steps b) to e) for each one of the public happenings Sn of the plurality of public happenings, and wherein the step f) of computing an optimum radius value Ro of the Area of Interest radius Ra as the average of the computed radius values Rk within which the public happening is detected, comprises: computing an optimum radius value Ro of the Area of Interest radius Ra as the average of the computed radius values Rk weighted by a number DSk of detected public happenings Sn within the Area of Interest having the Area of Interest radius Ra equal to the same computed radius values Rk, said number of detected public happenings DSk being the sum of the public happenings Sn determined by iterating step e).

In one embodiment of the present invention, the method further comprises for each calculated radius value: i) identifying a number of relevant served areas among the served areas of the mobile communication network, wherein said relevant served areas are served areas at least partially superimposed on the Area of Interest.

In one embodiment of the present invention, a served area is identified as a relevant served area if it verifies the following condition:

$$Dist(C,B) \leq |Rc+Rk|,$$

where C is the center of the Area of Interest, B is the center of the served area, Dist(C, B) is the geographical distance between the center of the Area of Interest C and the center of the served area B, Rc is the radius of the served area, and Rk is the calculated radius value.

In one embodiment of the present invention, the step b) identifying a first number Unk of user equipment comprises: identifying a user equipment of the first number Unk of user equipment, within at least one of the relevant served areas, and the step c) of identifying a second number Upnk of user equipment comprises: identifying a user equipment of the second number Upnk within at least one of the relevant served areas.

In one embodiment of the present invention, the step d) of combining the first number Unk of user equipment and the second numbers Upnk of user equipment for obtaining a statistical quantity Znk comprises: combining the second UE numbers Upnk of each one of the previous days gpn in order to determine an average UE number µnk and a UE number standard deviation σnk.

In one embodiment of the present invention, the step d) of combining the first number Unk of user equipment and the second numbers Upnk of user equipment for obtaining a statistical quantity Znk further comprises computing the statistical quantity Znk as:

$$Znk=(Unk-\mu nk)\sigma nk,$$

wherein Unk is the first number, µnk is the average UE number and σnk is the UE number standard deviation.

In one embodiment of the present invention, the plurality of calculated radius values Rk ranges from a minimum radius value Rmin to a maximum radius value i, each calculated radius value Rk being separated from a next calculated radius value by an iteration width Δ.

In one embodiment of the present invention, the step g) of counting a number of persons that gathered for attending at the public happening Sn within the area of interest having the Area of Interest radius Ra equal to the optimum radius value Ro comprises: j) identifying a number of relevant served areas among the served areas comprised in the mobile communication network, wherein said relevant served areas are served areas at least partially superimposed on the Area of Interest having the Area of Interest radius Ra equal to the optimum radius value Ro.

In one embodiment of the present invention, a served area is identified as a relevant served area if it verifies the following inequality:

$$Dist(C,B) \leq |Rc+Ro|,$$

where C is the center of the Area of Interest, B is the center of the served area, Dist(C, B) is the geographical distance between the center of the Area of Interest C and the center of the served area B, Rc is the radius of the served area, and Ro is the optimum radius value.

In one embodiment of the present invention, the step g) of counting a number of persons that gathered for attending at the public happening Sn within the area of interest having the Area of Interest radius Ra equal to the optimum radius Ro value further comprises: k) building a UE list uLn comprising an identifier of each user equipment UEj associated with at least one event record $er_i$ among the event records $er_i$ occurred in the time interval [Tsn; Ten] on the day gn within the AoI.

In one embodiment of the present invention, the step g) of counting a number of persons that gathered for attending at the public happening within the area of interest having the AoI radius Ra equal to the optimum radius value Ro further comprises for each user equipment UEj of the UE list uLn: l) computing an average intermediate arrival time iat between consecutive event records $er_i$, $er_{i'}$ associated with the user equipment UEj.

In one embodiment of the present invention, the average intermediate arrival time iat is computed on the basis of event records $er_i$, $er_{i'}$ occurred on both the day gn and on the previous days gpn.

In one embodiment of the present invention, the step g) of counting a number of persons that gathered for attending at the public happening Sn within the area of interest having the Area of Interest radius Ra equal to the optimum radius value Ro further comprises for each user equipment UEj of the UE list uLn: m) identifying a first time data $tdn_f$ and last time data $tdn_l$ referred to a first event record $er_f$ and a last event record $er_l$, respectively, occurred in the time interval [Tsn; Ten] on the day gn within the AoI, and n) combining the first time data $tdn_f$, the last time data $tdn_l$ and the average intermediate arrival time iat in order to determine a first time fraction f1, indicating a time period that the user equipment UEj has spent within the AoI on the day gn during the time interval [Tsn; Ten].

In one embodiment of the present invention, the first time fraction f1 is determined as:

$$f1 = \frac{|tdn_f - tdn_l + iat|}{Ten - Tsn}$$

where $tdn_l$ is the first time data, $tdn_f$ is the last time data, iat is the average intermediate arrival time, Tsn is the start time of the public happening and Ten is the end time of the public happening.

In one embodiment of the present invention, the step g) of counting a number of persons that gathered for attending at the public happening Sn within the area of interest having the Area of Interest radius Ra equal to the optimum radius value Ro further comprises for each user equipment UEj of the UE list uLn: o) identifying a first previous time data and last previous time data referred to a first event record and a last event record, respectively, occurred in the time interval on the previous days within the Area of Interest, and p) combining the first previous time data $tdn_f$, the last previous time data $tdn_l$ and the average intermediate arrival time iat in order to determine a second time fraction f2, indicating a time period that the user equipment UEj has spent within the Area of Interest during the previous days gpn.

In one embodiment of the present invention, the second time fraction f2 is determined as:

$$f2 = \frac{|tdpn_l - tdpn_1 + iat|}{Tgpn},$$

where $tdpn_l$ is the first previous time data, $tdpn_f$ is the last previous time data, iat is the average intermediate arrival time, and Tgpn is total duration of the previous days.

In one embodiment of the present invention, the step g) of counting a number of persons that gathered for attending at the public happening Sn within the area of interest having the Area of Interest radius Ra equal to the optimum radius value Ro further comprises for each user equipment UEj of the UE list uLn: q) combining the first time fraction f1 and the second time fraction f2 in order to determine a probability that the owner of the user equipment UEj attended at the public happening Sn.

In one embodiment of the present invention, the probability pj that the owner of the user equipment attended at the public happening is computed as:

$$pj=f1*(1-f2),$$

wherein f1 is the first time fraction and f2 is the second time fraction.

In one embodiment of the present invention, the step g) of counting a number of persons that gathered for attending at the public happening Sn within the area of interest having the Area of Interest radius Ra equal to the optimum radius value Ro further comprises: r) computing a persons number An that gathered for attending at the public happening Sn as the sum of probabilities pj determined for each user equipment UEj of the UE list uLn.

In one embodiment of the present invention, the method further comprises the step of: s) iterating steps j) to r) for each one of the public happenings Sn.

Another aspect of the present invention proposes a system coupled with a wireless telecommunication network for estimating a number of persons that gathered at an Area of Interest. The system comprises a computation engine adapted to process data retrieved from a mobile telephony network, a repository adapted to store data regarding interactions between the user equipment and the mobile telephony network, computation results generated by the computation engine and, possibly, any processing data generated by and/or provided to the system, and an administrator interface operable for modifying parameters and/or algorithms used by the computation engine and/or accessing data stored in the repository. The system according to the present invention further comprises a memory element storing a software program product configured for implementing the method of above through the system.

In one embodiment of the present invention, the system further comprises at least one user interface adapted to receive inputs from, and to provide output to a user of the system, the user comprising one or more human beings and/or one or more external computing systems subscriber of the services provided by the system.

One of the advantages of the solution according to the present invention is that it is computationally simple, involving just operations of counting and algebraic operations.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
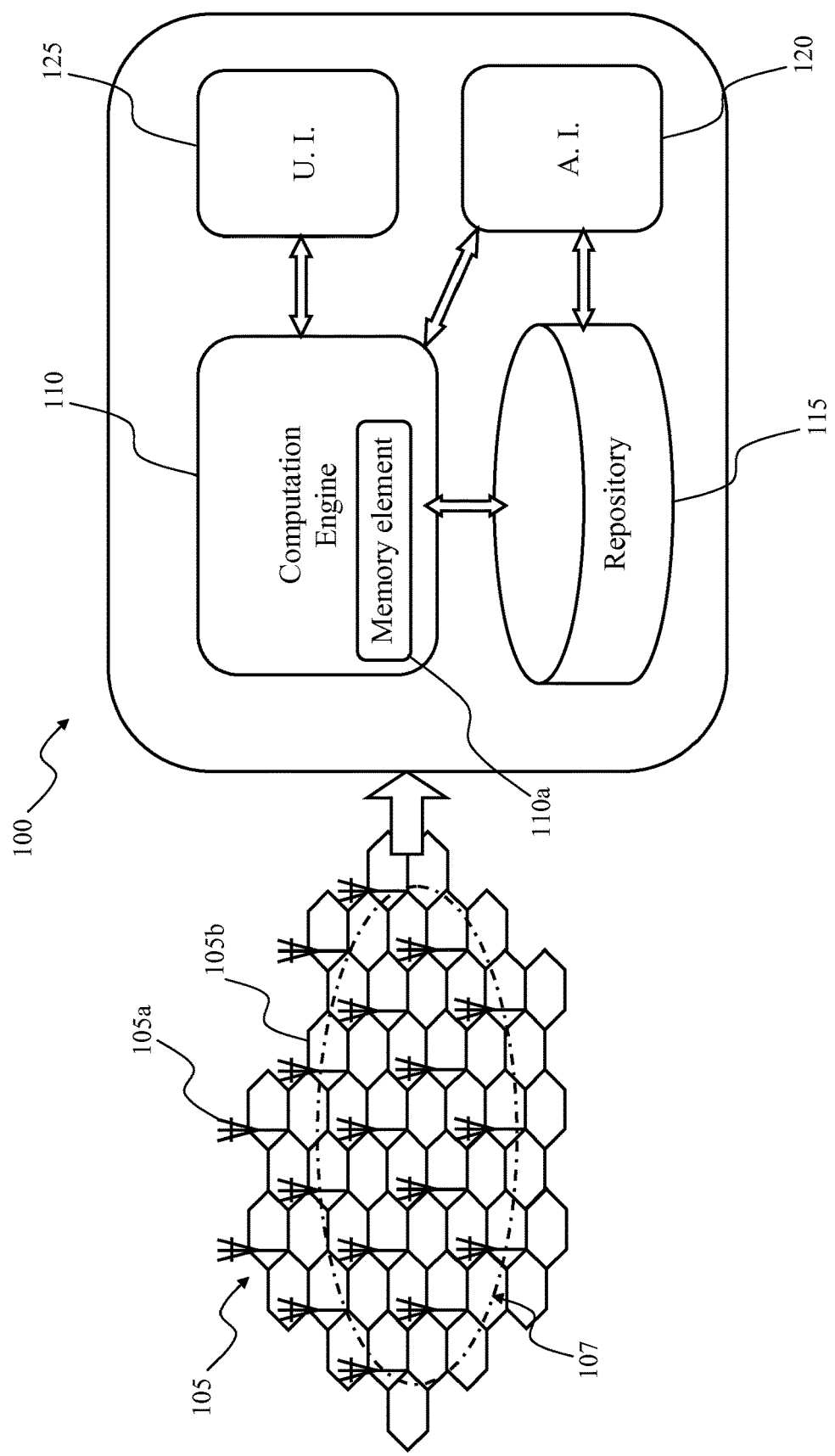
FIG. 1 is a schematic representation of a crowd estimation system according to an embodiment of the present invention.

With reference to the drawings, FIG. 1 is a schematic representation of a crowd estimation system, simply denoted as system 100 hereinafter, according to an exemplary embodiment of the present invention.

The crowd estimation system allows performing an estimation of a number of persons in a crowd gathered for attending at one or more public happenings, of the most disparate nature, like for example (and non-exhaustively) live television shows, artistic/entertaining performances, cultural exhibitions, theatrical plays, sports contests, concerts, movies, demonstrations and so forth.

The system 100 is coupled to a mobile communication network 105, such as a (2G, 3G, 4G or higher generation) mobile telephony network, and is configured for receiving from the mobile communication network 105 positioning data of each User Equipment, UE in the following (e.g. a mobile phone, a smartphone, a tablet with 2G-3G-4G connectivity, etc.), of individuals located in a geographic Area of Interest, AoI in brief, schematized in FIG. 1 as the area within the dash-and-dot line 107 (e.g., a building, such as for example a stadium or a theatre or a cinema, the surroundings thereof, a square or a street(s) of a city or town or village, a district etc.).

The AoI 107 (further described in the following) may generally comprise a core place (e.g., a stadium, a theater, a city square and so on) where one or more public happenings have taken place and, possibly, surroundings (e.g., nearby parking lots, nearby streets, nearby transport stations and so forth) of the core place.

The mobile communication network 105 comprises a plurality of (two or more) communication stations 105a (e.g., radio base stations of the mobile telephony network) geographically distributed through the AoI 107. Each communication station 105a is adapted to manage communications of UE (not shown, such as for example mobile phones) in one or more served areas or cells 105b (in the example at issue, three cells are served by each communication station 105a) as will be discussed in greater detail below.

Even more generally, each communication station 105a of the mobile communication network 105 is adapted to interact with any UE located within one of the cells 105b served by such communication station 105a (e.g., interactions at power on/off, at location area update, at incoming/outgoing calls, at sending/receiving SMS and/or MMS, at Internet access etc.). Such interactions between UE and mobile communication network 105 will be generally denoted as events $e_i$ (i=1, ..., I; where I is an integer) in the following.

The system 100 comprises a computation engine 110 configured to be adapted to process data retrieved from the mobile communication network 105, and a repository 115 (such as a database, a file system, etc.) configured to be adapted to store data regarding interactions between the UE and the mobile communication network 105, computation results generated by the computation engine 110 and, possibly, any processing data generated by and/or provided to the system 100 (generally in a binary format). The system 100 is provided with an administrator interface 120 (e.g., a computer) configured and operable for modifying parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) adapted to receive inputs from, and to provide output to a user of the system 100. The term "user of the system" as used in the present disclosure may refer to one or more human beings and/or to external computing systems (such as a computer network, not shown) of a third party being subscriber of the services provided by the system 100 and enabled to access the system 100—e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing administrator and user interfaces 120 and 125) or of virtual type (e.g., by implementing one or more virtual machines in a computer network).

The system 100 is adapted to retrieve (and/or receive) an event record $er_i$ for each event $e_i$ occurred between a UE and the mobile communication network 105 (through one of its communication stations 105a) within the AoI 107. Preferably, each event record $er_i$ retrieved by the system 100 from the mobile communication network 105 comprises—in a non-limitative manner—an identifier of the UE that is involved in the corresponding event $e_i$ (e.g., the UE identifier may be selected as one or more among the International Mobile Equipment Identity—IMEI, the International Mobile Subscriber Identity—IMSI and the Mobile Subscriber ISDN Number—MSISDN code), time data (also denoted as timestamp) indicating the time at which the corresponding event $e_i$ has occurred, and UE geographical position data, e.g. spatial indications based on the cell 105b in which the UE is located at the time of occurrence of the corresponding event $e_i$.

In one embodiment of the present invention, the UE identifier of the UE involved in the event record $er_i$ may be provided as encrypted information in order to ensure the privacy of the UE owner. Anyway, if the need arises, the encrypted information (i.e., the identity of the owner of the UE corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2012.

The system 100 may retrieve (and/or receive) the event records $er_i$ related to a generic UE from the mobile communication network 105 by acquiring records of data generated and used in the mobile communication network 105. For example, in case the mobile communication network 105 is a GSM network, Charging Data Records (CDR), also known as call data records, and/or Visitor Location Records (VLR) may be retrieved from the mobile communication network 105 and re-used as event records $er_i$. The CDR is a data record (usually used for billing purposes by a mobile telephony service provider operating through the mobile communication network 105) that contains attributes specific to a single instance of a phone call or other communication transaction performed between a UE and the mobile communication network 105. The VLR are databases listing UE that have roamed into the jurisdiction of a Mobile Switching Center (MSC, not shown) of the mobile communication network 105, which is a management element of the mobile communication network 105 managing events over a plurality of communication stations 105a. Each communication station 105a in the mobile communication network 105 is usually associated with a respective VLR.

Conversely, if the mobile communication network 105 is a LTE network, records of data associated with the event records $er_i$ of a generic UE are generated by a Mobility Management Entity, or MME, comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_i$ comprising a univocal identifier of individuals (such as the UE identifier mentioned above), a position indication of such individuals, and a time indication of an instant during which such event has occurred.

In operation, event records $er_i$ may be continuously retrieved by the system 100 from the mobile communication network 105. Alternatively, event records $er_i$ may be collected by the system 100 periodically, e.g. for a predetermined time period (e.g., every certain number of hours, on a daily or weekly basis). For example, event records $er_i$ may be transferred from the mobile communication network 105 to the system 100 as they are generated, in a sort of "push" modality, or event records $er_i$ may be collected daily in the mobile communication network 105 and then packed and transferred to the system 100 periodically or upon request by the system 100.

The event records $er_i$ retrieved from the mobile communication network 105 are stored in the repository 115, where they are made available to the computation engine 110 for processing. Preferably, event records $er_i$ generated by a same UE are grouped together in the repository 115, i.e. event records $er_i$ are grouped together if they comprise a common UE identifier and are denoted to as event records group $erg_j$ (e.g., l=0, . . . , L, L≥0) hereinafter.

Preferably, the computation engine 110 processes a crowd estimation algorithm (described in the following) implemented by a software program product stored in a memory element 110a of the system 110, comprised in the computation engine 110 in the example of FIG. 1, even though the software program product could be stored in the repository 115 as well (or in any other memory element provided in the system 100).

Even more preferably, the event records $er_v$ are processed according to the event records $er_i$ (as discussed in detail below) according to instructions provided by the system administrator (through the administrator interface 120), for example stored in the repository 115, and, possibly, according to instructions provided by a user (through the user interface 125). Finally, the computation engine 110 provides the results of the processing performed on the event records $er_i$ to the user through the user interface 125, and optionally stores such processing results in the repository 115.

Turning now to FIGS. 2A-2E, they are exemplary shapes in which the cells 105b of the mobile communication network 105 may be modeled according to an embodiment of the present invention.

Figure 2D:
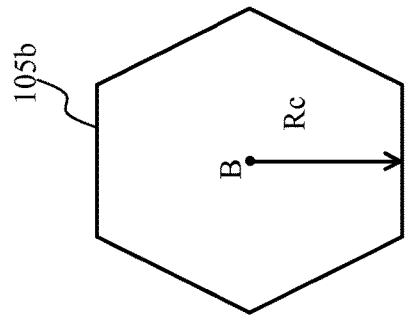
FIGS. 2A-2E are exemplary shapes in which the cells of the mobile communication network may be modeled according to an embodiment of the present invention.
Figure 2E:
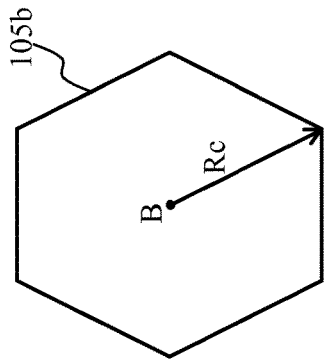
Figure 2B:
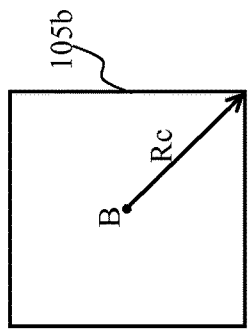
Figure 2C:
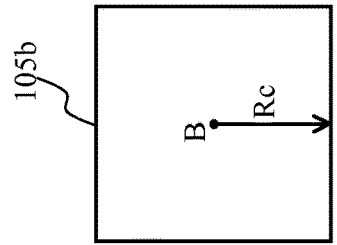
Figure 2A:
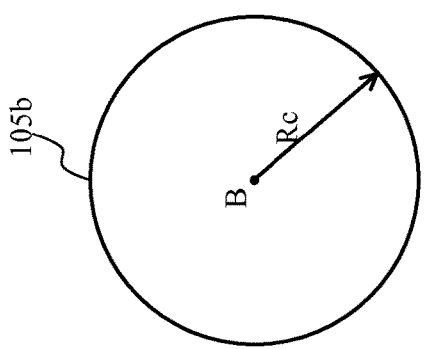

For the purposes of the present invention, each cell 105b of the mobile communication network 105 may be modeled as an area (as shown in FIG. 2A) having a respective cell center B (not necessarily corresponding to a geographic position of the communication station 105a) and a respective cell radius Rc, that encloses an effectively served area (not shown) served by the corresponding communication station 105a (e.g., an area in which each point is reached by radio-signals transmitted by the communication station 105a). Alternatively, the cell radius Rc may correspond to the radius of a circumference that encloses a substantial part of the effectively served area, such as the 85% or more of the effectively served area, such as for example the 90%, of the effectively served area.

It should be noted that the cells 105b are not limited to a disc-like shape, in facts, the cells 105b may have the shape of a, preferably regular, polygon. In this case, the cell center B corresponds to a center of mass (or centroid) of the polygon, while the cell radius Rc corresponds to a segment adjoining the center of mass of the polygon, i.e. the cell center B, with a vertex of the polygon (as shown in FIGS. 2B and 2D) or with a midpoint of a side of the polygon (as shown in FIGS. 2C and 2E).

The effectively served area, and therefore the cell radius Rc, may be defined by means of well-known network planning software tools used by a provider of the mobile communication network 105, or may be computed on the basis of (omnidirectional or directional, such as with 120° radiation angles) antennas radiation diagrams and simple radiation models such as for example the ones described in Theodore S. Rappaport, "Wireless Communications", Prentice Hall, 1996.

Alternatively, the mobile communication network 105 may be modeled by means of a Voronoi tessellation diagram, in which each Voronoi cell corresponds to a cell 105b of the mobile communication network 105 (since Voronoi tessellation diagrams are well known in the art, they are not discussed further herein).

Preferably, the modeling, the list and the number of cells 105b of the mobile communication network 105 are inputted to the system 100 by the administrator through the administrator interface 120.

In the solution according to an embodiment of the present invention, the system 100 is adapted to identify whether individuals attended to one or more public happenings occurred within the AoI 107 based on events $e_i$ generated by an interaction between the UE and the mobile communication network 105 serving such UE within the AoI 107.

Turning now to FIGS. 3A-3E, they are exemplary shapes that the AoI 107 to be determined may take according to an embodiment of the present invention.

Figure 3D:
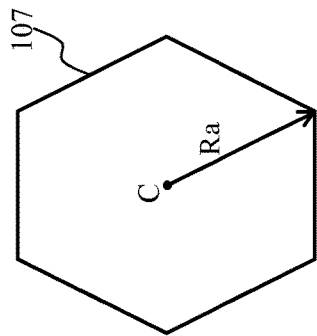
FIGS. 3A-3E are exemplary shapes that the AoI to be determined may take according to an embodiment of the present invention.
Figure 3E:
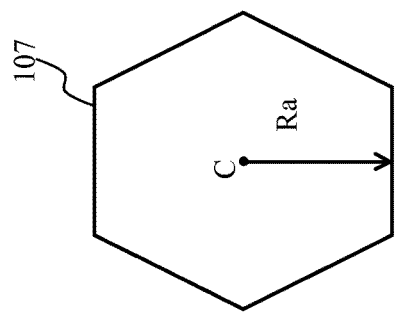
Figure 3B:
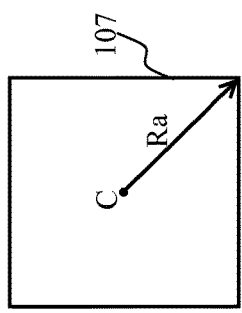
Figure 3C:
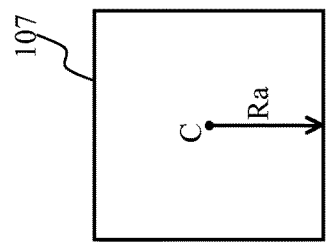
Figure 3A:
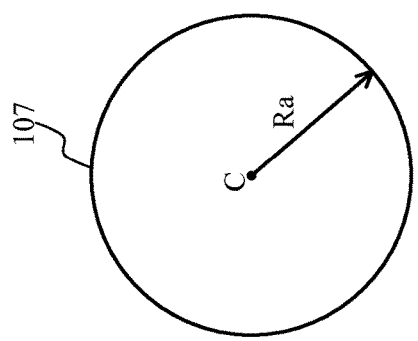
Figure 4A:
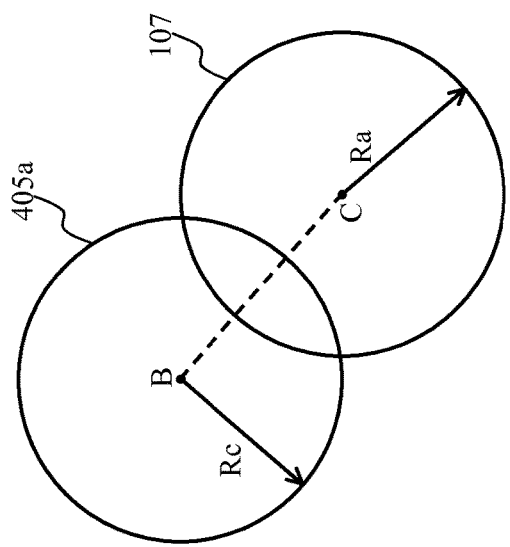
FIGS. 4A-4D are relevant cells among the cells of the mobile communication network 105 with respect to the AoI according to an embodiment of the invention.
Figure 4B:
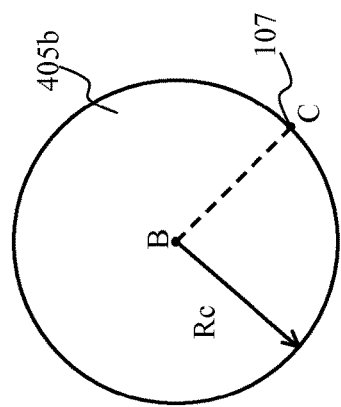
Figure 4C:
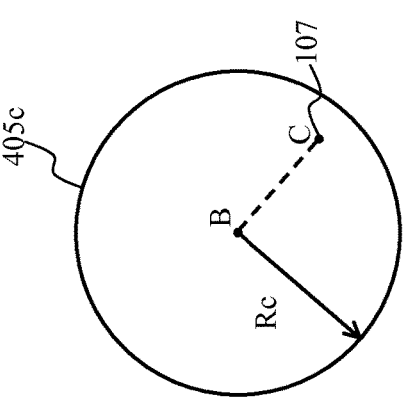
Figure 4D:
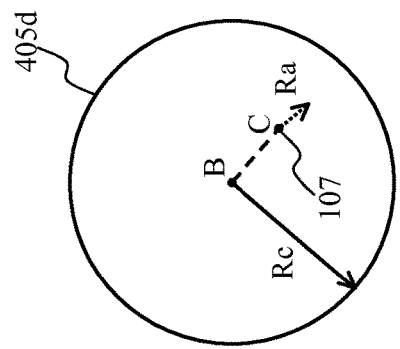

Generally, the AoI 107 for one or more public happenings may be modeled as an area having an AoI center C and an AoI radius Ra. For example, the AoI 107 may be delimited by a circumference centered in the AoI center C and having the AoI radius Ra as circumference radius (as shown in FIG. 3A).

It should be noted that the AoI 107 may have shapes different from the circumference. For example, the AoI 107 may have the shape of a, preferably regular, polygon. In this case, the AoI center C corresponds to a center of mass (or centroid) of the polygon, while the AoI radius Ra corresponds to a segment adjoining the center of mass of the polygon with a vertex of the polygon (as shown in FIGS. 3B and 3D) or with a midpoint of a side of the polygon (as shown in FIGS. 3C and 3E) in a similar way as for the cells 105b modeling discussed above.

The AoI center C may be set (e.g., by a user through the user interface 125 or by a system administrator through the administrator interface 120) as a (geographical) central point of the AoI 107 (e.g., a geographical central point of the core place), as an address of the core place of the one or more public happenings, as a point provided by a mapping software, such as web mapping services (e.g., Google Maps™, OpenStreetMap™, etc.).

As will be described in more detail in the following, the AoI radius Ra may take zero or negative values along with positive values. In case the AoI radius Ra takes zero or negative values, the AoI 107 is limited to the AoI center C (i.e., the core place of the one or more public happenings). The meaning of zero or negative values for the AoI radius Ra will be further clarified by reference to such zero or negative values in the embodiments described below.

The algorithm described in the following is configured to determine an optimum radius value Ro for the AoI radius Ra of the AoI 107. In one embodiment of the invention, the optimum radius value Ro is determined by means of iterative steps starting from a minimum radius value Rmin to a maximum radius value Rmax (as described hereinbelow). Preferably, the minimum radius value Rmin and the maximum radius value Rmax are set by the administrator of the system 100 through the administrator interface 120.

In an embodiment of the present invention, on the basis of statistical analysis of empirical data regarding a plurality of past public happenings the minimum radius value Rmin is set equal to −1500 m (Rmin=−1500 m), while the maximum radius value Rmax is set equal to 1500 m (Rmax=1500 m).

Having defined the shape of the cell 105b of the mobile communication network 105 and the shape of the AoI 107, the concept of relevant cell, i.e., a cell 105b of the mobile communication network 105 that is considered at least partially belonging to the AoI 107 according to an embodiment of the invention will be now be introduced.

FIGS. 4A-4D are relevant served areas or cells 405a-d among the cells 105b of the mobile communication network 105 with respect to the AoI 107 according to an embodiment of the invention.

In one embodiment of the invention, given the AoI 107 having the AoI center C and the generic cell 105b having the cell center B and the cell radius Rc, the generic cell 105b may be considered a relevant cell 405a-d for the AoI 107 if the following inequality is verified:

$$\text{Dist}(C,B) \leq |Rc+Ra|, \quad (1)$$

where Dist(C, B) is the geographical distance between the AoI center C and the cell center B.

According to the value of the AoI radius Ra of the AoI 107, inequality (1) may take three different meanings.

Namely, if the AoI radius Ra of the AoI 107 is greater than zero (i.e., Ra>0), inequality (1) reduces to:

$$\text{Dist}(C,B) \leq (Rc+Ra) \quad (2)$$

and the generic cell 105b is considered a relevant cell (such as the case of relevant cell 405a in FIG. 4A) for the AoI 107 having an AoI radius Ra greater than zero if the area of the AoI 107 and the generic cell 105b are at least partially superimposed (even if the AoI center C fall outside the generic cell 105b).

If the AoI radius Ra of the AoI 107 is equal to zero (i.e., Ra=0) the inequality (1) reduces to:

$$\text{Dist}(C,B) \leq Rc \quad (3)$$

and the generic cell 105b is considered a relevant cell (such as the case of relevant cells 405b and 405c in FIGS. 4B and 4C) for the AoI 107 having an AoI radius Ra equal to zero if the AoI center C of the AoI 107 is comprised in the generic cell 105b.

Finally, if the AoI radius Ra of the AoI 107 is smaller than zero (i.e., Ra<0) the generic cell 105b is considered a relevant cell (such as the case of relevant cell 405d in FIG. 4D) for the AoI 107 having an AoI radius Ra smaller than zero if the AoI center C of the AoI 107 is comprised within the generic cell 105b at a distance from the cell center B equal to or smaller than Rc−|Ra|.

A generic public happening S, apart from being held at a specific location (i.e., the AoI 107), has a start time Ts and an end time Te. Consequently, for the purposes of the present invention the generic public happening S has a relevant duration equal to an observation time interval [Ts, Te] (i.e., a time interval that starts at the a start time Ts and ends at the end time Te, lasting for Te−Ts time units, e.g. seconds, minutes or hours).

Both the start time Ts and the end time Te may be defined so as to correspond to the official (officially announced) start and end times scheduled for that generic public happening S. Nevertheless, the Applicant has observed that by anticipating the start time Ts with respect to the official start time of the generic public happening S it is possible to take into account the fact that people (i.e., UE owners that attend at the generic public happening S) arrive at the AoI 107 before the official start time of the generic public happening S, which may be useful for collecting data about a trend in time of a flow of attendees arriving at the generic public happening S. For example, on the basis of empirical data of previous public happenings, the Applicant has found that the start time Ts may be usefully anticipated to 60 minutes before the official start time of the generic public happening S in order to take into account the trend of attendees arriving at the generic public happening S.

Similarly, the Applicant has observed that the end time Te may be delayed with respect to the official end time of the generic public happening S in order to take into account the fact that people leave the AoI 107 after the official end time of the generic public happening S, which may be useful for collecting data about a trend in time of a flow of attendees leaving the generic public happening S. For example, on the basis of empirical data of previous public happenings, the Applicant has found that the end time Ts may be usefully delayed by 30 minutes after the official end time of the generic public happening S in order to take into accounts the trend of attendees leaving the generic public happening S.

Anyway, the administrator through the administrator interface 120, and/or the user through the user interface 125, may set any custom start time Ts and end time Te for the generic public happening S. For example, the start time Ts and the end time Te may be set in order to define the observation time interval [Ts, Te] shorter than the effective duration of the generic public happening S (i.e., shorter than the duration of the whole public happening) in order to analyze a number or a variation of persons in the crowd attending at the generic public happening S only during a sub-portion of the whole time duration of the generic public happening S.

Figure 5A:
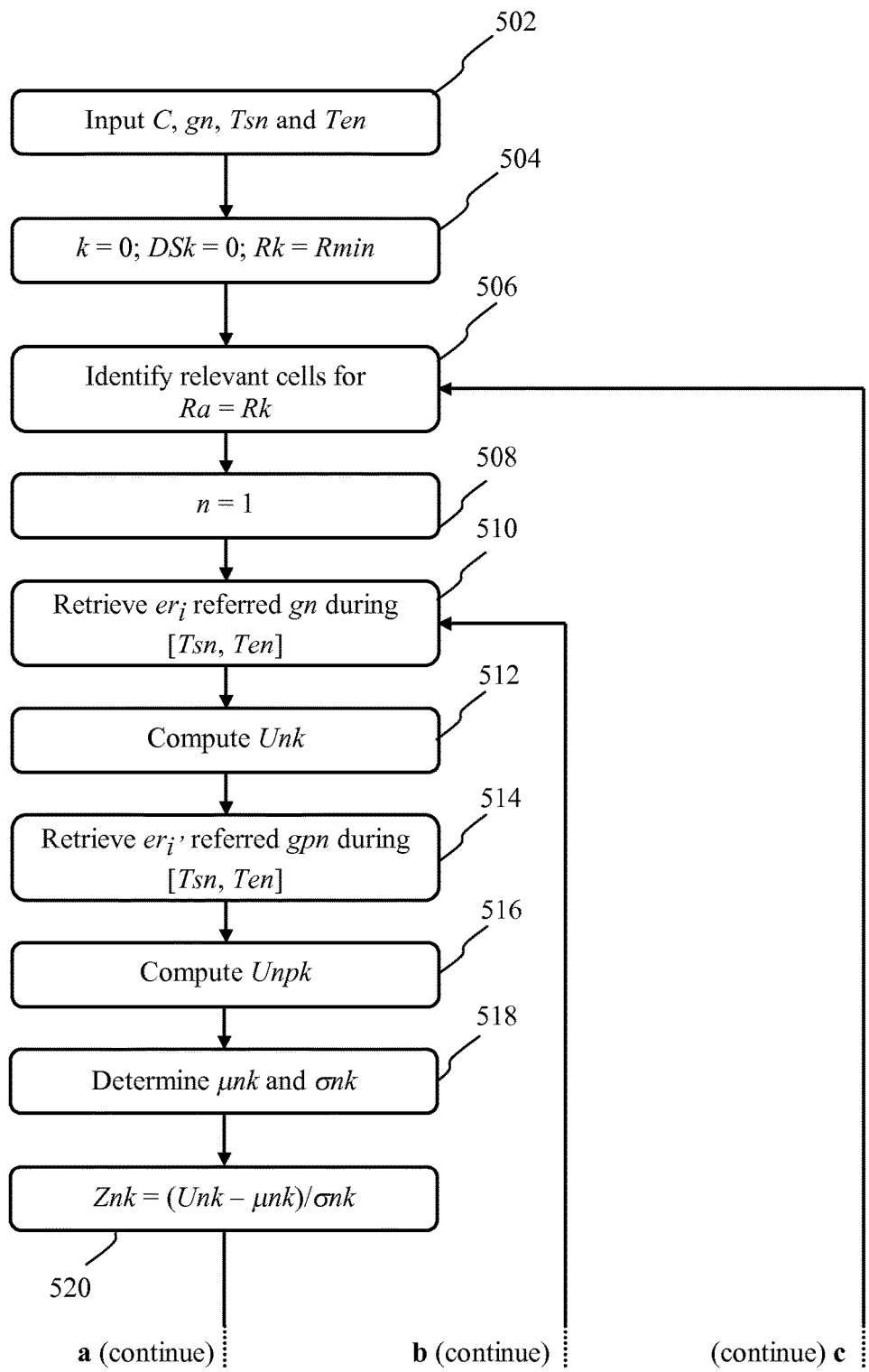
FIGS. 5A-5C are a schematic flowchart of a public happenings evaluation algorithm according to an embodiment of the present invention.
Figure 5B:
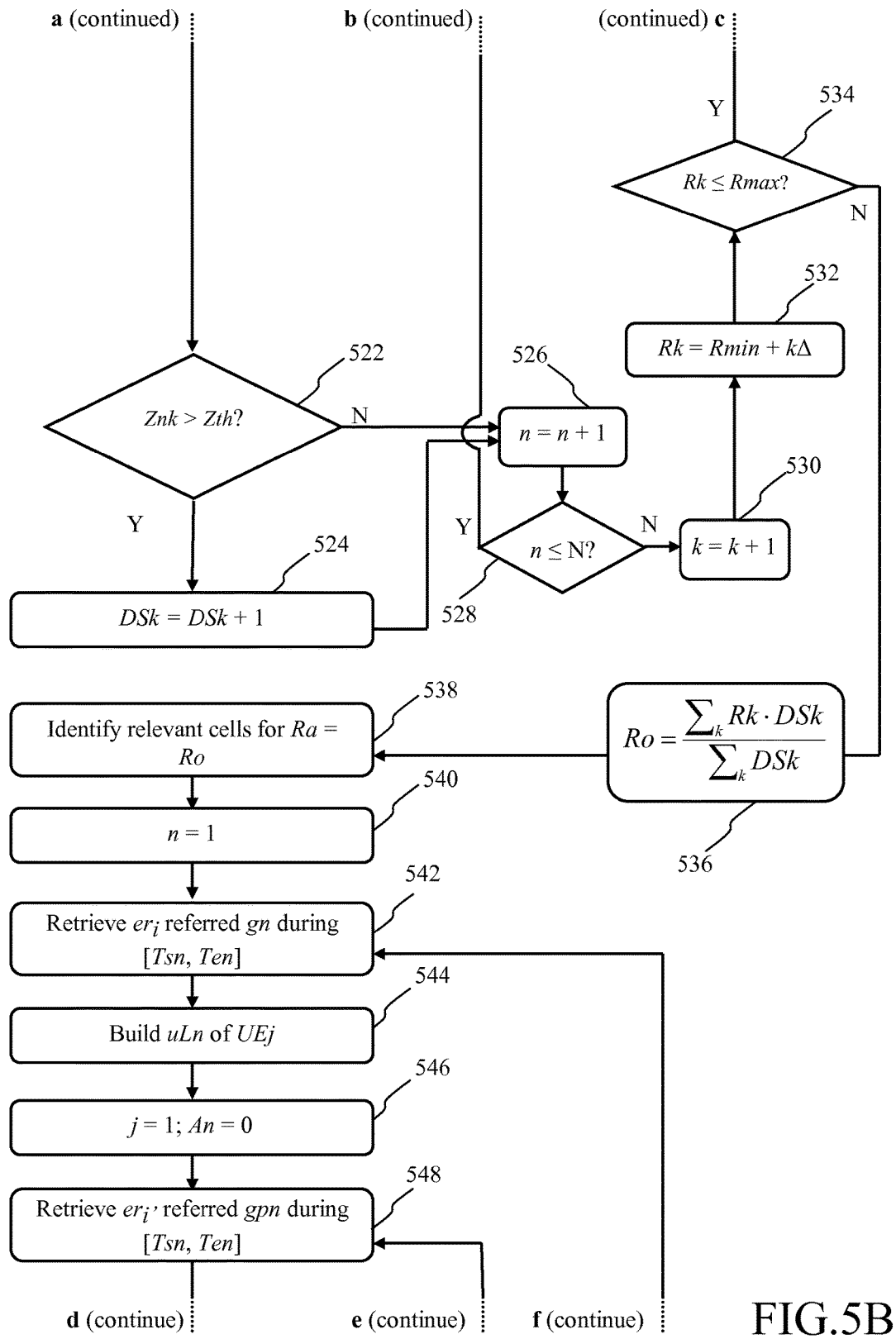
Figure 5C:
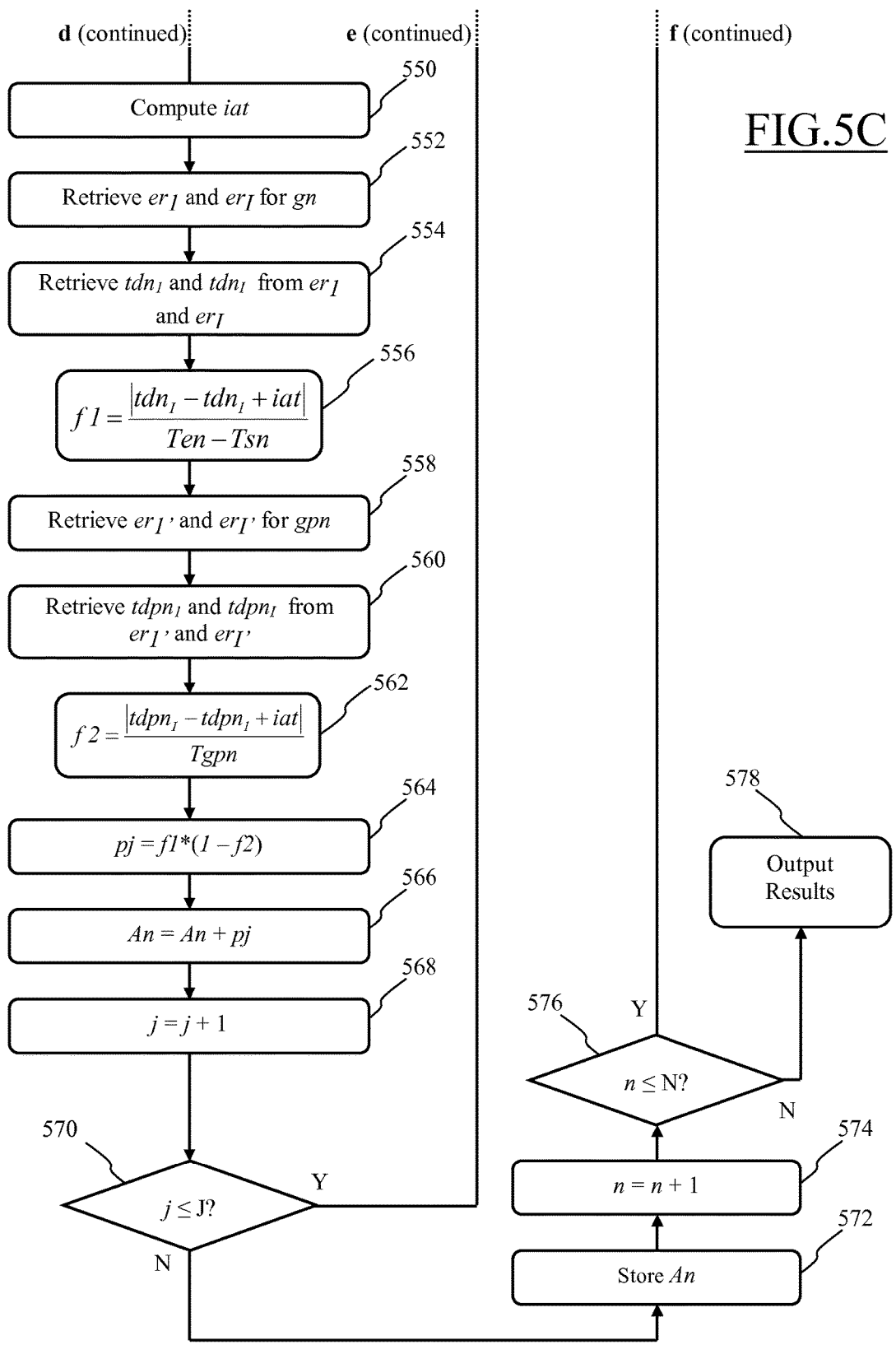

Having described the system 100, and the time (i.e., the start time Ts and the end time Te) and spatial (i.e., the AoI center C and AoI radius Ra of the AoI 107) characteristics of a generic public happening S, a crowd estimation algorithm (or crowd counting algorithm) of persons attending at one or more public happenings according to an embodiment of the present invention will be now described, by making reference to FIGS. 5A-5C, which are a schematic block diagram thereof.

Let N (where N is an integer number, that may be defined by the administrator through the administrator interface 120 and/or by the user through the user interface 125) be a number of public happenings Sn, where n is a happening variable indicating which of the N public happenings is considered (i.e., 1≤n≤N), held in a same AoI 107 of which the number of persons in the respective crowd attending thereat is to be determined.

For each public happening Sn, an observation day gn during which the public happening Sn has been held, the start time Tsn and the end time Ten are defined. It should be noted that the start time Tsn and the end time Ten may vary from one public happening Sn to the other.

Moreover, for each public happening Sn a set of previous days gpn (where 1≤p≤P and P is an integer number) preceding the observation day gn are considered. The number P of previous days gpn considered is preferably set by the administrator (through the administrator interface 120). In an embodiment of the present invention, the administrator sets the number P of previous days gpn according to the storage capabilities of the repository 115 (i.e., in order to be able to store all the data regarding the P previous days gpn) and/or on the basis of computational capabilities of the computation engine 110 (i.e., in order to be able to process all the data regarding the P previous days gpn). Preferably, the administrator sets the number P of previous days gpn also on the basis of a statistical analysis of past public happenings of the same kind (i.e., cultural, entertaining, politics or sport shows).

The Applicant has found that by setting the number P of previous days gpn equal to 6 (i.e., P=6) provides good results for most kind of public happenings (although this should not be construed as limitative for the present invention).

A first portion of the crowd estimation algorithm is configured to determine the optimum radius value Ro for the AoI radius Ra of the AoI 107 on the basis of the data regarding all the N public happening Sn considered.

Initially (step 502) the AoI center C, the observation days gn and the start times Tsn and end times Ten are inputted to the system 100, e.g. by a user through the user interface 125 or by the administrator through the administrator interface 120.

Afterwards (step 504), an iteration variable k is initialized to zero (i.e., k=0), a detected number of happening variable DSk is initialized to zero as well (i.e., DSk=0) and a calculated radius value Rk is initially set to the minimum radius value Rmin (i.e., Rk=Rmin). The iteration variable k accounts for the number of iterations of the first portion of the algorithm, the detected number of happening variable DSk accounts for the number of public happenings Sn detected during the iterations of the first portions of the algorithm (as described in the following) and the calculated radius value Rk is used in determining the optimum radius value Ro.

Next (step 506), the relevant cells 405a-d for the AoI 107 having a AoI radius Ra equal to the calculated radius value Rk (Ra=Rk) are identified by means of the inequality (1) as described above.

Afterwards (step 508), the day variable n is initialized, e.g. to unity (n=1).

All the event records $er_i$ referred to the observation day gn during an observation time interval [Tsn, Ten] and referred to the relevant cells 405a-d determined at step 506 are retrieved (step 510) from the repository 115.

Subsequently (step 512), a first UE number Unk is computed as the number of UEs corresponding to (i.e., being associated with) at least one event record $er_i$ among the event records $er_i$ referred to relevant cells 405a-d that have been retrieved at previous step 506 (the first UE number Unk depends on the relevant cells and, therefore, on the calculated radius value Rk).

Similarly, all the event records $er_i'$ referred to the previous days gpn during the observation time interval [Tsn, Ten] and having taken place within the relevant cells 405a-d determined at step 506 are retrieved (step 514) from the repository 115.

Then (step 516), it is computed a second UE number Upnk for each one of the previous days gpn as the number of UEs corresponding to at least one event record $er_i'$ among the event records $er_i'$ referred to relevant cells 405a-d that have been retrieved at previous step 506 (the second UE numbers Upnk depends on the relevant cells and, therefore, on the calculated radius value Rk).

The second UE numbers Upnk just computed are combined (step 518) in order to determine an average UE number $\mu nk$ $$\left(\text{with } \mu nk = \sum_{p=1}^{P} Upnk\right)$$

and a UE number standard deviation $\sigma nk$ $$\left(\text{with } \sigma nk = \sqrt{\frac{\sum_{p=1}^{P}(Upnk - \mu nk)^2}{P}}\right)$$

of the UE number within the relevant cells 405*a-d* during the observation time interval [Tsn, Ten] on the P previous days gpn considered.

The average UE number $\mu nk$ and the UE number standard deviation $\sigma nk$ are combined (step 520) with the first UE number Unk in order to obtain a (statistical) quantity defined z-score Znk (which depends on the calculated radius value Rk):

$$Znk = (Unk - \mu nk)/\sigma nk. \quad (4)$$

The z-score Znk just computed is compared (step 522) with a z-score threshold Zth and it is checked whether the z-score Znk is greater than the z-score threshold Zth, or:

$$Znk > Zth. \quad (5)$$

The z-score threshold Zth is a value preferably defined by the administrator through the administrator interface 120 on the basis of statistical analysis of past public happenings of the same kind (e.g., cultural, entertaining, politics or sport happenings).

The Applicant has found that setting the z-score threshold Zth equal to 2 (i.e., Zth=2) provides good results for most kind of public happenings (although this should not construed as limitative for the present invention).

In the affirmative case (exit branch Y of decision block 522), i.e. the z-score Znk is greater than the z-score threshold Zth (i.e., Znk>Zth), one of the N public happenings Sn is detected and the detected number of happenings variable DSk is increased by unity (step 524; i.e., DSk=DSk+1) and operation proceeds at step 526 (described hereinbelow).

In the negative case (exit branch N of decision block 522), i.e. the z-score Znk is equal to, or lower than, the z-score threshold Zth (i.e., Znk≤Zth), the happening variable n is increased by unity (step 526; i.e., n=n+1).

Then (step 528), it is checked whether the happening variable n is lower than, or equal to, the number N of public happening Sn:

$$n \leq N. \quad (6)$$

In the affirmative case (exit branch Y of decision block 528), i.e. the variable n is lower than, or equal to, the number N of overall public happenings Sn (n≤N), operation returns to step 510 for analyzing the event records $er_i$ referred to the public happening Sn held on the next observation day gn.

In the negative case (exit branch N of decision block 528), i.e. the happening variable n is greater than the number N of overall public happenings Sn (n>N; i.e., all the N public happenings Sn have been analyzed), the variable k is increased by unity (step 530; i.e., k=k+1) and the calculated radius value Rk is increased (step 532):

$$Rk = Rmin + k\Delta, \quad (7)$$

where $\Delta$ is an iteration width that may be defined by the administrator (e.g., $\Delta$=100 m), thus each calculated radius value Rk is separated from the next calculated radius value by an iteration width $\Delta$. It should be noted that the iteration width $\Delta$ define a maximum iteration value kmax for the iteration variable k—and, therefore, a maximum number of iterations for determining the optimum radius value Ro—as:

$$kmax = (|Rmin| + Rmax)/\Delta. \quad (8)$$

It should be noted that the iteration width $\Delta$ may be used by the system administrator to adjust a granularity (i.e., fineness) with which the optimum radius value Ro is determined, i.e. the smaller the iteration width $\Delta$ set by the administrator the higher the number of iterations defined by the maximum iteration value kmax and, thus, the finer a granularity of the crowd estimation algorithm.

In an embodiment of the present invention, since the minimum radius value Rmin is set to −1500 m, the maximum radius value Rmax is set to 1500 m and the iteration width $\Delta$ is set to 100 m the maximum iteration value kmax for the iteration variable k results to be equal to 30 and, therefore, the maximum number of iterations for determining the optimum radius value Ro is limited to 30.

Afterwards, it is checked (step 534) whether the calculated radius value Rk is lower than, or equal to, the maximum radius value Rmax:

$$Rk \leq Rmax. \quad (9)$$

In the affirmative case (exit branch Y of decision block 534), i.e. the calculated radius value Rk is lower than, or equal to, the maximum radius value Rmax (i.e., Rk≤Rmax) operation returns to step 506 for starting a new iteration of the first portion of the algorithm based on the calculated radius value Rk just increased (at step 532) by a further k-th iteration width $\Delta$.

In the negative case (exit branch N of decision block 534), i.e. the calculated radius value Rk is greater than the maximum radius value Rmax (i.e., Rk>Rmax), the optimum radius value Ro is computed (step 536) as the average of the computed radius values Rk (with 1≤k≤kmax) weighted by the number DSk of detected public happening Sn within the AoI 107 having the AoI radius Ra equal to the same computed radius values Rk, i.e. the detected number of happening variable DSk, or:

$$Ro = \frac{\sum_{k} Rk \cdot DSk}{\sum_{k} DSk}. \quad (10)$$

The steps 506 to 534 of the first portion of the crowd estimation algorithm are iterated until the calculated radius value Rk is greater than the maximum radius value Rmax (i.e., Rk>Rmax), and the optimum radius value Ro is computed (at step 536).

With the computation of the optimum radius value Ro at step 536 the first portion of the crowd estimation algorithm ends and then a second portion of the crowd estimation algorithm starts (at step 538, described in the following). At the end of the first portion of the crowd estimation algorithm, the AoI 107 is properly defined by the AoI center C and by the AoI radius Ra set equal to the optimum radius value Ro (Ra=Ro).

The second portion of the crowd estimation algorithm according to an embodiment of the present invention is configured to determine a number of persons in the crowds gathered at each one of the N public happenings Sn considered.

After the optimum radius value Ro has been computed at step 536, a set of actually relevant cells 405a-d is defined (step 538). This set includes all the cells 105b of the mobile communication network 105 for which inequality (1) is verified when the AoI radius Ra is set equal to the optimum radius value Ro, or:

$$\mathrm{Dist}(C,B) \le |Rc+Ro|. \quad (11)$$

Then (step 540), the happening variable n is initialized to unity (n=1) anew and all the event records $er_i$ referred to the observation day gn during the observation time interval [Ts, Te] and having taken place within the actually relevant cells 405a-d determined at step 538 are retrieved (step 542) from the repository 115.

Subsequently (step 544), a UE list uLn is build. The UE list uLn comprises an identifier of each UE associated with at least one event record $er_i$ among the event records $er_i$ referred to relevant cells that have been retrieved at previous step 542.

The UE list uLn provides a first estimation of possible persons in the crowd attending at the public happening Sn, i.e. the owners of the UE comprised in the UE list uLn. Therefore, in a simplified embodiment of the invention, the crowd estimating algorithm may simply compute the UE list uLn for each one of the N overall public happenings Sn and provide the N resulting UE lists uLn to the user through the user interface 125.

Once the UE list uLn has been built, a UE variable j is initialized to unity (i.e., j=1) and a persons number An is initialized to zero (i.e., An=0) (step 546). The UE variable j is used for scanning all the users comprised in the UE list uLn, while the persons number An accounts for the number of persons in the crowd gathered for attending at the public happening Sn (as described in the following).

All the event records $er_i'$ referred to a UE UEj recorded in each one of the previous days gpn during observation time interval [Tsn, Ten] and having taken place within any one of the cells 105b of the mobile communication network 105 are retrieved (step 548) from the repository 115.

Then (step 550), an average intermediate arrival time iat between consecutive event records $er_i$ is computed for the UE UEj. In one embodiment of the invention, intermediate arrival times for the UE UEj are computed as the difference between time data (i.e., timestamps) of two consecutive event records $er_i$. Preferably, the average intermediate arrival time iat is computed on the basis of event records $er_i$ recorded during the observation day gn retrieved at step 542 and the P previous days gpn retrieved at step 548.

A first event record $er_f$ and a last event record $er_l$ referred to the observation day gn during the observation time interval [Tsn, Ten] and having took place within the effectively relevant cells 405a-d determined at step 538 are identified for the UE UEj (step 552) and a respective first observation time data $tdn_f$ and last observation time data $tdn_l$ are retrieved (step 554) therefrom.

The first observation time data $tdn_f$, the last observation time data $tdn_l$ and the average intermediate arrival time iat are combined (step 556) in order to determine a first time fraction f1 that the UE UEj has spent within the AoI 107 during the observation day gn during the observation time interval [Tsn, Ten]:

$$f1 = \frac{|tdn_l - tdn_f + iat|}{Ten - Tsn} \quad (12)$$

Subsequently, a first event record $er_f'$ and a last event record $er_l'$ among all the event records $er_i'$ referred to the P previous days gpn during the observation time interval [Tsn, Ten] and having took place within the effectively relevant cells 405a-d determined at step 538 are identified for the UE UEj (step 558) and a respective first previous time data $tdpn_f$ and last previous time data $tdpn_l$ are retrieved (step 560) therefrom.

The first previous time data $tdpn_f$, the last previous time data $tdpn_l$ and the average intermediate arrival time iat are combined (step 562) in order to determine a second time fraction f2 that the UE UEj has spent within the AoI 107 during the P previous day gpn:

$$f2 = \frac{|tdpn_l - tdpn_f + iat|}{Tgpn}, \quad (13)$$

where Tgpn is total duration of the P previous days gpn, which may be computed for example in seconds, minutes or hours according to the time unit (i.e., seconds, minutes or hours) used for time quantities (such as for example the first previous time data $tdpn_f$, the last previous time data $tdpn_l$ and the average intermediate arrival time iat) in the crowd estimation algorithm.

Afterwards (step 564), a person probability pj that the owner of the UE UEj attended at the public happening Sn is computed by combining the first time fraction f1 and the second time fraction f2:

$$pj=f1*(1-f2) \quad (14)$$

Therefore, the first time fraction f1 and the second time fraction f2 may be considered as probabilities. Namely, the first time fraction f1 may be construed as the probability that the owner of the UE UEj has been in the AoI 107 during the public happening Sn, while the second time fraction f2 may be construed as the probability that the owner of the UE UEj has been in the AoI 107 during the previous days gpn.

The persons number An is then updated (step 566) by adding the person probability pj to the actual value of the persons number An, or:

$$An=An+pj. \quad (15)$$

It should be noted that the persons number An according to the present invention is computed as the sum of the persons probabilities pj referred to each respective owner of each UE UEj listed in the UE list uLn.

The UE variable j is increased by unity (step 568; i.e., j=j+1) and it is checked (step 570) whether UE variable j is lower than, or equal to, a total number of listed UE J (where J is an integer number) listed in the UE list uLn:

$$j \le J. \quad (16)$$

In the affirmative case (exit branch Y of decision block 570), i.e. the UE variable j is lower than, or equal to, the number J of listed user J (j≤J), the operation returns to step 548 for analyzing the event records $er_i$ referred to the next UE UEj.

In the negative case (exit branch N of decision block 570), i.e. the UE variable j is greater than the total number of listed user J (j>J), the UE list uLn has been completely scanned. Therefore the persons number An referred to the public happening Sn held on the observation day gn is stored (step 572) in the repository 115, then the happening variable n is increased by unity (step 574; i.e., n=n+1) and it is checked (step 576) whether the happening variable n is lower than, or equal to, the number N of public happenings Sn (in the same way as done at previous step 528):

$$n \leq N. \qquad (6)$$

In the affirmative case (exit branch Y of decision block 576), i.e. the happening variable n is lower than, or equal to, the number N of public happenings Sn (n≤N), operation returns to step 542 in order to analyze the next public happening Sn held on the next happening day gn.

In the negative case (exit branch N of decision block 576), i.e. the happening variable n is greater than the number N of overall public happenings Sn (n>N), all the N public happenings Sn have been analyzed and thus the crowd estimation algorithm may be terminated.

Preferably, the algorithm is terminated by providing (step 578) the results, i.e. the N persons number An and, possibly, the N UE lists uLn and the respective first and second time fractions f1 and f2 for each UE of the UE lists uLn determined at step 544, to the user through the user terminal 125 for inspection and/or further processing.

The steps 542 to 576 of the second portion of the crowd estimation algorithm are iterated until all the N public happenings Sn have been analyzed and thus the crowd estimation algorithm is terminated (at step 578) with the provision of the results to the user through the user terminal 125.

In summary, the crowd estimation algorithm comprises a first portion and a second portion.

In its turn, the first portion of the crowd estimation algorithm comprises two nested cycles. A first external cycle scans (steps 506-534) all the computed radius values Rk between the minimum radius value Rmin and the maximum radius value Rmax, while a first internal cycle scans (steps 510-528) scans all the N public happenings Sn to be analyzed. For each computed radius value Rk respective relevant cells 405a-d and z-score Znk are determined. On the basis of such data (i.e., respective relevant cells 405a-d and z-score Znk) the detected happening variable DSk is computed and the optimum radius value Ro is identified. At the end of the first portion of the crowd estimation algorithm, the AoI 107 having the optimum radius value Ro is defined.

The second portion of the algorithm comprises two nested cycles as well. A second external cycle scans (steps 542-576) all the N public happening Sn held within the AoI 107, while a second internal cycle scans (steps 548-570) all the UE UEj that generated an event record $er_i$ in at least one relevant cell 405a-d (i.e., the AoI 107) during the observation time interval [Tsn, Ten] in the observation day gn. For each UE UEj and for each one of the N public happenings Sn, it is determined a time spent (i.e., the first time fraction f1) by the UE owner within one or more of the relevant cells 405a-b comprised within the AoI 107 having the AoI radius Ra equal to the optimum radius value Ro during the observation time interval [Tsn, Ten] on the observation day gn of the public happening Sn and a further time spent (i.e., the second time fraction f2) within the same AoI 107 during the P previous days gpn. On the basis of the knowledge of this times spent in the AoI 107 it is determined the probability that the owner of the UE UEj was a person in the crowd that attended at the public happening Sn and, on the basis of this probability, the number of persons in the crowd that attended at the public happening Sn is determined.

The crowd estimation system 100 and the crowd estimation algorithm according to an embodiment of the present invention allows a posteriori estimation of the number of persons in a crowd attending at one or more public happenings Sn in a reliable way and allows properly identifying (by determining the optimum radius value Ro) an effective extension of the AoI 107 associated with each of the one or more public happenings Sn.

The invention claimed is:

1. A method of estimating a number of persons that gathered at an area of interest for attending a public happening during a time interval on a day, wherein said area of interest is defined by an area of interest center and an area of interest radius and is covered by a mobile telecommunication network having a plurality of communication stations each of which is adapted to manage communications of user equipment (UE) in one or more served areas in which the mobile telecommunication network is subdivided, the method comprising:
   a) defining a plurality of calculated radius values of the area of interest radius, and, for each calculated radius value:
   b) identifying a first number of user equipment associated with at least one event record of a corresponding event of interaction occurred between the user equipment and the mobile communication network during the time interval on the day within the area of interest;
   c) identifying a second number of user equipment associated with at least one event record of a corresponding event of interaction occurred between the user equipment and the mobile communication network during the time interval for each day of a predetermined number of previous days preceding the day within the area of interest;
   d) combining the first number of user equipment and the second numbers of user equipment for obtaining a statistical quantity;
   e) detecting the occurrence of the public happening if the statistical quantity reaches a certain threshold;
   f) computing an optimum radius value of the area of interest radius as the average of the calculated radius values within which the public happening is detected;
   g) using the optimum radius value of the area of interest radius to estimate a number of persons that gathered for attending at the public happening within an area of interest having the area of interest radius equal to the optimum radius values.

2. The method according to claim 1, wherein the public happening comprises a plurality of public happenings, the method further comprising the step of:
   h) iterating steps b) to e) for each one of the public happenings of the plurality of public happenings, and
   wherein the step f) of computing an optimum radius value of the area of interest radius as the average of the computed radius values within which the public happening is detected, comprises:
   computing an optimum radius value of the area of interest radius as the average of the computed radius values weighted by a number of detected public happenings within the area of interest having the area of interest radius equal to the same computed radius values, said number of detected public happenings being the sum of the public happenings determined by iterating step e).

3. The method according to claim 2, further comprising for each calculated radius value:

i) identifying a number of relevant served areas among the served areas of the mobile communication network, wherein said relevant served areas are served areas at least partially superimposed on the area of interest.

4. The method according to claim 3, wherein a served area is identified as a relevant served area if it verifies the following condition:

$$Dist(C, B) \leq |Rc+Rk|,$$

where C is the center of the area of interest, B is the center of the served area, Dist(C, B) is the geographical distance between the center of the area of interest C and the center of the served area B, Rc is the radius of the served area, and Rk is the calculated radius value.

5. The method according to claim 3, wherein the step b) identifying a first number of user equipment comprises:
   identifying a user equipment of the first number of user equipment, within at least one of the relevant served areas, and
wherein the step c) of identifying a second number of user equipment comprises:
   identifying a user equipment of the second number within at least one of the relevant served areas.

6. The method according to claim 1, wherein the step d) of combining the first number of user equipment and the second numbers of user equipment for obtaining a statistical quantity comprises:
   combining the second UE numbers of each one of the previous days in order to determine an average UE number and a UE number standard deviation.

7. The method according to claim 6, wherein the step d) of combining the first number of user equipment and the second numbers of user equipment for obtaining a statistical quantity further comprises:
   computing the statistical quantity as:

$$Znk = (Unk - \mu nk)/\sigma nk,$$

wherein Unk is the first number, $\mu nk$ is the average UE number and $\sigma nk$ is the UE number standard deviation.

8. The method according to claim 1, wherein the plurality of calculated radius values ranges from a minimum radius value to a maximum radius value, each calculated radius value being separated from a next calculated radius value by an iteration width.

9. The method according to claim 3, wherein the step g) of counting a number of persons that gathered for attending at the public happening within the area of interest having the area of interest radius equal to the optimum radius value comprises:
   j) identifying a number of relevant served areas among the served areas comprised in the mobile communication network, wherein said relevant served areas are served areas at least partially superimposed on the area of interest having the area of interest radius equal to the optimum radius value.

10. The method according to claim 9, wherein a served area is identified as a relevant served area if it verifies the following inequality:

$$Dist(C, B) \leq |Rc+Ro|,$$

where C is the center of the area of interest, B is the center of the served area, Dist(C, B) is the geographical distance between the center of the area of interest C and the center of the served area B, Rc is the radius of the served area, and Ro is the optimum radius value.

11. The method of claim 9, wherein the step g) of counting a number of persons that gathered for attending at the public happening within the area of interest having the area of interest radius equal to the optimum radius value further comprises:
   k) building a user equipment list comprising an identifier of each user equipment associated with at least one event record among the event records occurred in the time interval on the day within the area of interest.

12. The method according to claim 11, wherein the step g) of counting a number of persons that gathered for attending at the public happening within the area of interest having the area of interest radius equal to the optimum radius value further comprises for each user equipment of the user equipment list:
   l) computing an average intermediate arrival time between consecutive event records associated with the user equipment.

13. The method according to claim 12, wherein the average intermediate arrival time is computed on the basis of event records occurred on both the day and on the previous days.

14. The method according to claim 12, wherein the step g) of counting a number of persons that gathered for attending at the public happening within the area of interest having the area of interest radius equal to the optimum radius value further comprises for each user equipment of the user equipment list:
   m) identifying a first time data and last time data referred to a first event record and a last event record, respectively, occurred in the time interval on the day within the area of interest, and
   n) combining the first time data, the last time data and the average intermediate arrival time in order to determine a first time fraction , indicating a time period that the user equipment has spent within the area of interest on the day during the time interval.

15. The method according to claim 14, wherein the step g) of counting a number of persons that gathered for attending at the public happening within the area of interest having the area of interest radius equal to the optimum radius value further comprises for each user equipment of the user equipment list:
   o) identifying a first previous time data and last previous time data referred to a first event record and a last event record, respectively, occurred in the time interval on the previous days within the area of interest, and
   p) combining the first previous time data, the last previous time data and the average intermediate arrival time in order to determine a second time fraction, indicating a time period that the user equipment has spent within the area of interest during the previous days.

16. The method according to claim 15, wherein the step g) of counting a number of persons that gathered for attending at the public happening within the area of interest having the area of interest radius equal to the optimum radius value further comprises for each user equipment of the user equipment list:
   q) combining the first time fraction and the second time fraction in order to determine a probability that the owner of the user equipment attended at the public happening.

17. The method according to claim 16, wherein the step g) of counting a number of persons that gathered for attending at the public happening within the area of interest having the area of interest radius equal to the optimum radius value further comprises:

r) computing a persons number that gathered for attending at the public happening as the sum of probabilities determined for each user equipment of the user equipment list.

18. The method according to claim 17, further comprising the step of:
s) iterating steps j) to r) for each one of the public happenings.

19. A system coupled with a wireless telecommunication network for estimating a number of persons that gathered at an area of interest, the system comprising:
a computation engine configured to process data retrieved from a mobile telephony network;
a repository configured to store data regarding interactions between the user equipment and the mobile telephony network, computation results generated by the computation engine and processing data generated by and/or provided to the system,
an administrator interface configured to modify parameters and/or algorithms used by the computation engine, and/or access data stored in the repository, and
a non-transitory memory element storing a software program product configured to implement the method of claim 1 through the system.

20. The system according to claim 19, further comprising at least one user interface configured to receive inputs from, and to provide output to a user of the system, the user comprising one or more human beings and/or one or more external computing systems that are subscribers of the services provided by the system.

* * * * *